Figure 1:
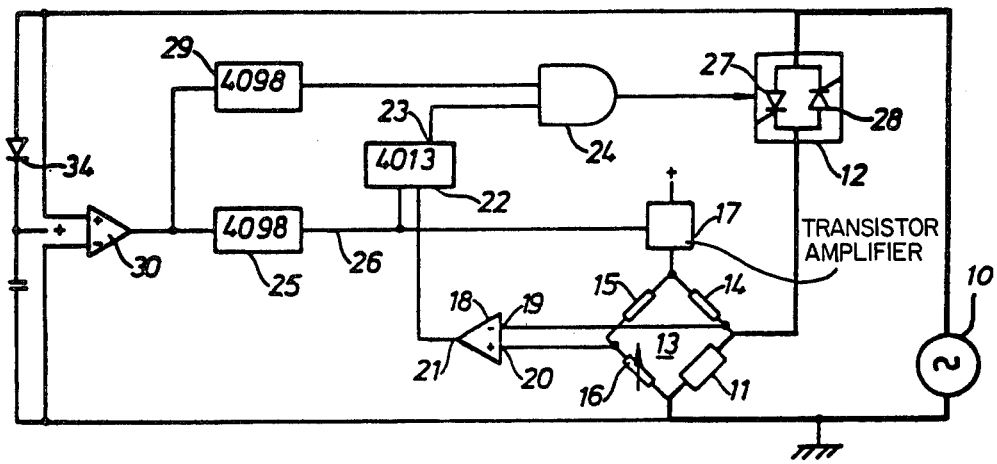

United States Patent [19]

Andreasson

[11] Patent Number: 4,483,284
[45] Date of Patent: Nov. 20, 1984

[54] IGNITION SYSTEM FOR CONTROLLING CURRENT FLOW TO A GLOW PLUG

[75] Inventor: Jan Y. N. Andreasson, Huskvarna, Sweden

[73] Assignee: Aktiebolaget Electrolux, Stockholm, Sweden

[21] Appl. No.: 432,912

[22] PCT Filed: Dec. 29, 1981

[86] PCT No.: PCT/SE81/00393
§ 371 Date: Sep. 24, 1982
§ 102(e) Date: Sep. 24, 1982

[87] PCT Pub. No.: WO82/02744
PCT Pub. Date: Aug. 19, 1982

[30] Foreign Application Priority Data

Jan. 30, 1981 [SE] Sweden ................................ 8100749

[51] Int. Cl.³ ............................................. F02N 17/00
[52] U.S. Cl. .............................. 123/179 H; 123/145 A; 123/179 BG
[58] Field of Search ........ 123/179 BG, 179 B, 179 H, 123/145 A, 149 D, 179 SE, 185 BA; 219/497, 507

[56] References Cited

U.S. PATENT DOCUMENTS 2,840,067  6/1958  Carlson ........................... 123/145 A
3,412,290  11/1968  Hempson ....................... 123/145 A
3,623,464  11/1971  Patis ............................. 123/179 BG
4,322,604  3/1982  Kawamura et al. ............ 123/179 H

FOREIGN PATENT DOCUMENTS 0614253  12/1926  France ........................ 123/179 BG Primary Examiner—Parshotam S. Lall
Attorney, Agent, or Firm—Alfred E. Miller

[57] ABSTRACT

In an ignition system having at least one glow plug, the filament thereof is supplied with power from a generator by means of a switch device. The power is controlled whereby a constant glow temperature level is obtained, for example by means of a predetermined resistance in the filament. The arrangement is associated with a Wheatstone bridge which, during a short interval at the beginning of every heat current cycle, is switched on when generator power is not yet supplied to the glow plug. The balance of the Wheatstone bridge, which indicates whether the glow plug is too hot or too cold, is registered for the present cycle by means of a comparator in which the balance is converted into a logical signal to be the basis for an on/off regulation by the switch device in the heating circuit of the glow plug.

7 Claims, 2 Drawing Figures

IGNITION SYSTEM FOR CONTROLLING CURRENT FLOW TO A GLOW PLUG

The present invention relates to an ignition system with glow plugs adapted for use in an internal combustion engine.

A glow plug in an internal combustion engine is dependent on a current source which keeps the glow filament of the plug glowing. The power to the filament is rather low, e.g. 4 W, but the control of the temperature of the plug must be effected carefully in order to make the engine run evenly. In known embodiments of glow plug ignition a battery is used as a current source which i.a. demands a charging device. In small engines which are started by means of a rope starter the battery is a heavy and inconvenient accessory which should be avoided. It has therefore been found appropriate to create an alternative current source for the glow plug and also to introduce a control system for the current to keep a proper temperature in the plug.

The present invention provides an ignition system with glow plugs supplied from a generator via electronic control circuits. Such an ignition system will be simpler and cheaper than both a conventional spark ignition system and a glow plug with a battery. Among other advantages, a higher effect and more even idle running are achieved than is the case in engines with spark ignition systems. A glow plug is smaller than an ordinary spark plug and does not demand a high voltage insulation.

An embodiment of an ignition system according to the invention is described in the following with reference to the attached drawing in which FIG. 1 shows a simplified wiring diagram of the ignition system and FIG. 2 a diagram of different voltages.

The current source is constituted of a generator 10 driven by the engine that includes the ignition system. A glow plug 11 is supplied with alternating current from the generator via an electronic switch 12 which controls the current so that the glow plug obtains a predetermined heating current. A temperature measurement on the plug is carried out by a measuring procedure by means of a Wheatstone bridge 13 in which the resistance of the glow plug constitutes a branch. The other branches are constituted of two fixed resistors 14,15 and a variable resistor 16. By means of this variable resistor it is possible to adjust the balance of the bridge and thus also the temperature of the plug, as here will be described in detail.

Test pulses are supplied to one of the diagonals of the bridge from a transistor amplifier 17 and produce voltage pulses in the other diagonal to which a comparator 18 is connected. This comparator has the same working mode as a differential relay which closes one contact at a higher voltage on a first input 19 but another contact at a higher voltage on a second input 20, however, the comparator in the present case is electronic, e.g. the well-known standard module LM 339. A signal in the form of a logical "1" or "0" is delivered on the output of the comparator dependent on which of the inputs has the highest potential.

The signal is stored in a bistable flip-flop 22, e.g. the well-known standard module No. 4013, during a time of at least one cycle of the generator voltage. The stored signal remains on the output 23 of the flip-flop for this time and is conducted to an AND-gate 24 which is e.g. a National Semiconductor LM 339 module.

The generation of the test pulses takes place in a monostable flip-flop 25, e.g. the standard module No. 4098, releasing a pulse on a wire 26 to the transistor amplifier 19 at the beginning of every positive half cycle of the generator voltage. Thus, the measurement takes place at a moment when a generator current to the glow plug is not supplied, which is a necessary condition as only the test pulse may pass through the bridge at the test moment. The generator current is controlled by the switch 12 which in the shown embodiment comprises two anti-parallel thyristors 27,28 receiving trigger pulses from a monostable flip-flop (module 4098) 29 via the AND-gate 24. These trigger pulses are somewhat delayed in relation to the pulses on the wire 26, the reason why the thyristor starts to conduct only after the test pulse has passed the bridge. However, the trigger pulse may be stopped at the AND-gate if the pulse from the flip-flop 22 is missing owing to the balance of the bridge i.e. the temperature of the glow plug is above a certain minimum. The trigger pulses are transferred through the AND-gate if the flip-flop 22 at the test period senses that the glow plug is too cold. The thyristors then start to conduct, the one during a positive half cycle and the other during a negative half cycle, and the glow plug is supplied with power from the generator during a whole period. The question whether the glow plug should be supplied with power also during the next cycle is answered by the test in the bridge which thus starts that cycle. The control circuits endeavour to keep the glow plug temperature constant independent of the speed of the generator and the ambient temperature. The glow temperature level can be varied by adjusting the variable resistor 16 in the bridge.

Figure 2:
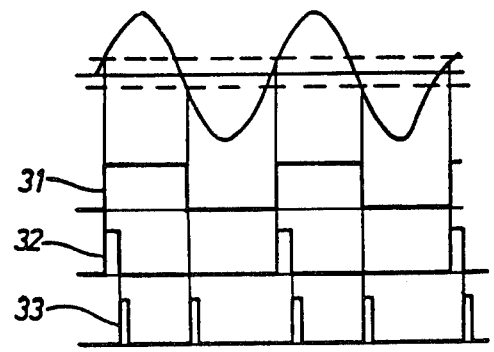

FIG. 2 illustrates some voltages used in the circuit of FIG. 1. The only current source used for the power supply of the components is the generator, the shown voltage of which is a sine curve. A voltage converter 30 such as the aforesaid module LM 339 completed with Zener diodes generates by means of this curve a square-shaped voltage 31 with a phase delay (hysteresis). This voltage is supplied to the flip-flops 25 and 29 which deliver control pulses 32 for the bridge test and trigger pulses 33 respectively. The flip-flop 29 is trigged from the converter as well as from the flip-flop 25 and hence the number of pulses 33 will be double the pulses 32. In order to generate potentials and operating voltages for the different components of the circuits the system is provided with a rectifier circuit 34 where the generator voltage is rectified into a direct voltage.

The aforesaid engine is considered to be of a small type provided in power tools like motor-saws, lawn-mowers, etc. and is started by manual force. The generator is during the start procedure driven via the engine and supplies the glow plug with electric power so that the glow filament reaches the glow temperature. This is possible due to the fact that the glow filament has a low heating-up period (the effect is some 4 W) and the generator already delivers full power at a low number of revolutions (about 1000 r.p.m.). When the engine in operation runs at a high r.p.m. the generator also runs at a high r.p.m. and delivers a high voltage which may be too high for the glow plug. The voltage to the plug can then be restricted by means of a shunt, e.g. Zener diodes or a non-linear resistor (thermistor) connected parallel to the generator (not shown).

The described embodiment is an example of how the invention can be realised. In fact a DC-generator can also be used as a current source for the glow plug and the components.

I claim:

1. In an internal combustion engine ignition system having a glow plug and means applying a heating current to said glow plug, said glow plug being connected in one branch of a Wheatstone bridge, the improvement wherein the means applying current comprises switch means, said system further comprising sensing means including comparator means connected to the bridge and having a first output level responsive to a predetermined resistance of said glow plug corresponding to a cold condition of the glow plug, a source of test pulses connected to said bridge, and means responsive to the simultaneous occurrence of said first output and one of said test pulses for controlling said switch means to apply current to said glow plug.

2. The system of claim 1 wherein said means responsive to the simultaneous occurrence of said first output and one of said test pulses comprises a flip-flop circuit, whereby the output of said flip-flop is set to a given level only upon the simultaneous occurrence of said first output and test pulse.

3. The system of claim 2 further comprising a source of trigger pulses, said means responsive to the simultaneous occurrence of said first output and test pulse further comprising gate means responsive to said given level output of said flip-flop and one of said trigger pulses for controlling said switch means to apply current to said glow plug.

4. The system of claim 3 wherein said switch means comprises an electronic switch.

5. The system of claim 4 wherein said electronic switch comprises thyristor means.

6. The system of claim 5 wherein said means applying a heating current to said glow plug further comprises a generator driven by said internal combustion engine.

7. The system of claim 6 wherein said generator produces an alternating current, and said source of test pulses and source of trigger pulses comprise monostable multivibrator means connected to be triggered by said alternating voltage, whereby current is applied to said glow plug for the remainder of any cycle during which said given level occurs at the time of occurrence of a trigger pulse.

* * * * *